Patented May 16, 1933

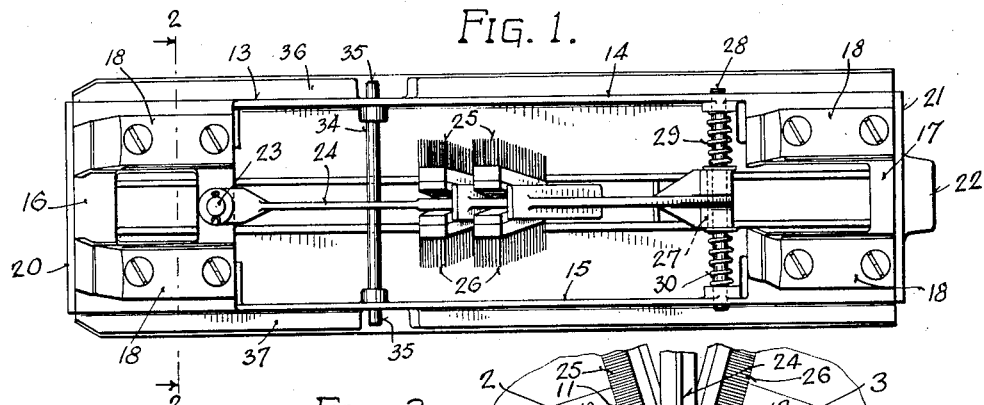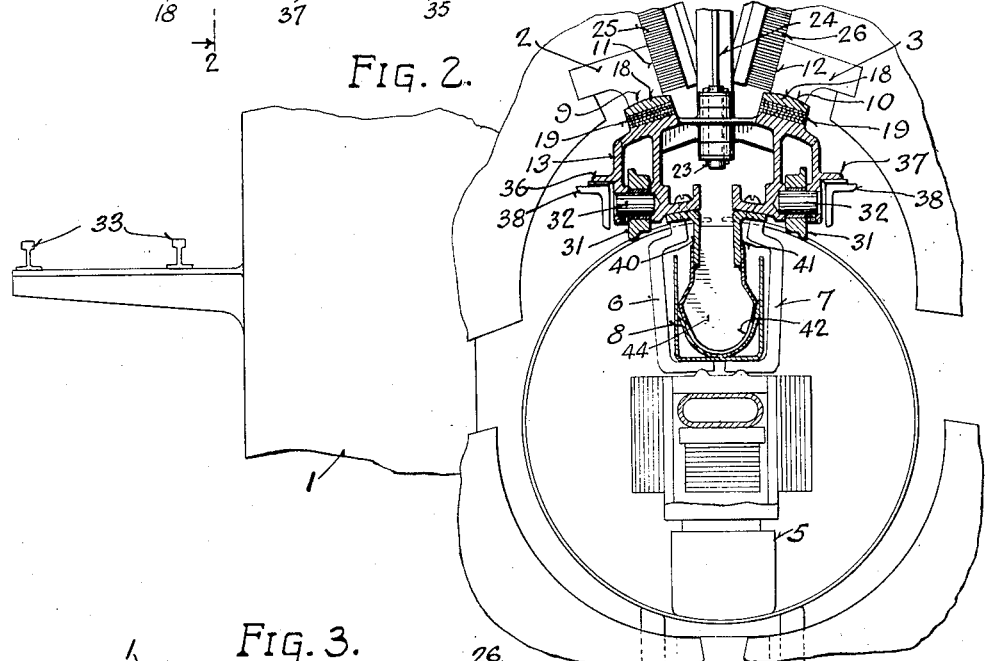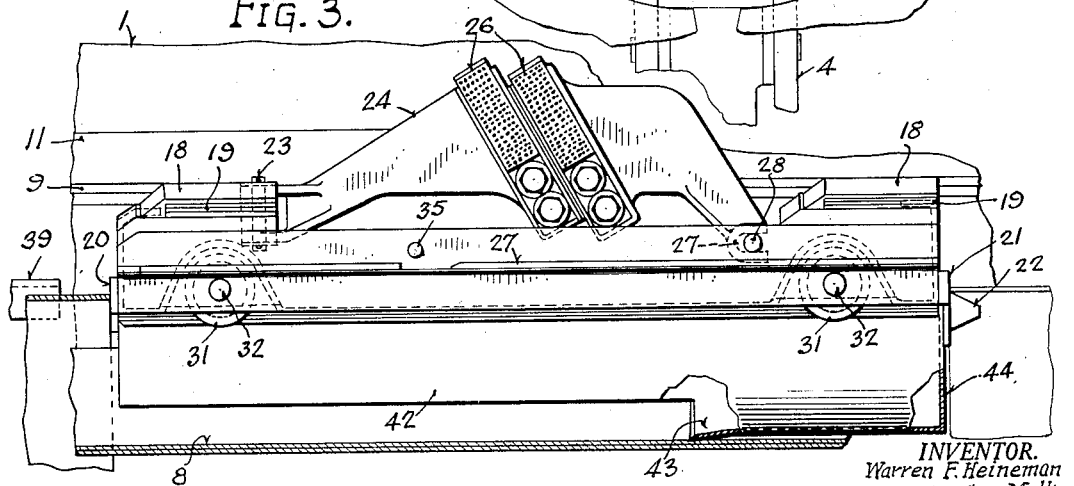

1,909,402

UNITED STATES PATENT OFFICE

WARREN F. HEINEMAN, OF SHOREWOOD, AND SVEN MALKE, OF MILWAUKEE, WISCONSIN, ASSIGNORS TO A. O. SMITH CORPORATION, OF MILWAUKEE, WISCONSIN, A CORPORATION OF NEW YORK

TOOL FOR FLASH WELDING MACHINES

Application filed November 17, 1930. Serial No. 496,234.

The invention relates to a tool to be used in conjunction with a machine for flash welding longitudinal seams in tubular articles such as is disclosed in the copending applications of Andren et al., Serial No. 435,090, filed March 12, 1930, and of Nilson et al., Serial No. 469,462, filed July 21, 1930.

More particularly, the invention is directed to a tool for cleaning the electrodes and for removing deposit from the flash receiving trough disposed within the arbor.

In the drawing:

Figure 1 is a top view of the tool.

Fig. 2 is a sectional view taken on line 2—2 of Figure 1 showing certain elements of the welding machine diagrammatically.

Fig. 3 is a side elevation showing the tool being moved through the welding machine, partly shown.

Referring to the drawing, the numeral 1 designates generally a welding machine having a pair of electrodes 2 and 3 adapted to be moved relatively toward and away from each other in a manner, not shown, to establish and maintain an electric arc between the same and thereby heat the edges to a welding temperature after which the edges are forced together to complete the weld. The numeral 4 indicates a support for the blank which is vertically movable to raise the blank into pressure contact with the electrodes 2 and 3. Disposed within the blank is an arbor 5 having a plurality of pairs of oppositely disposed pivotal arms 6 and 7 with ends thereof adapted to engage the inner wall of the blank directly beneath the electrodes and to maintain an effective pressure contact between the electrodes and the wall of the blank.

Disposed between the arms 6 and 7 is a trough 8 which is adapted to receive the metal flashed downwardly from the edges during the welding operation.

For a complete description of the construction and operation of this type of welding machine, reference is made to the above mentioned copending applications.

The present invention is directed to a tool for cleaning the contacts 9 and 10 and the faces 11 and 12 of the electrodes and to also remove the metal flash from the trough 8.

The tool comprises a frame 13 having spaced longitudinally extending members 14 and 15 connected together at the ends thereof by cross members 16 and 17. Projecting upwardly from the corners of the frame 13 and suitably secured thereto, are bearing plates 18 which are adapted to engage the contact faces 9 and 10 of the electrodes 2 and 3. The bearing plates 18 preferably are formed of fiber or suitable soft material which will not scratch or mar the faces of the electrode contacts. A plurality of shims 19 are provided between the bearing plates 18 and the frame member 13 so that the vertical position of the bearing plates may be readily adjusted.

The frame is provided with a plate 20 extending transversely across the front end thereof, (left side of Figs. 1 and 3) which is adapted to abut against the welded blank and the opposite end of the frame is provided with a transverse bar 21 against which the blank being inserted into the machine is adapted to abut.

The plate 21 is provided with a rearwardly extending horn 22 over which the blank being inserted is adapted to ride and prevent tilting of the tool during its traverse through the machine.

Pivotally connected to the frame 13 at the front end thereof by means of a pin 23 is a longitudinally extending bracket 24 which projects upwardly from the frame between the electrodes 2 and 3. The bracket 24 is provided with a plurality of oppositely disposed brushes 25 and 26, preferably arranged obliquely to the direction of travel and which are adapted to engage the faces 11 and 12 of the electrodes and to remove any foreign material adhering thereto.

The rear end of the bracket 24 is provided with a slot 27 in which a transverse pin 28 is received. The pin 28 has its ends connected to the longitudinal members 14 and 15 of the frame. Surrounding the pin on opposite sides of the bracket 24 are springs 29 and 30 which tend to maintain the bracket 24 in proper position but which will permit a slight pivotal movement thereof to center the brushes 25 and 26 between the electrodes.

The frame 13 is further provided with a plurality of rollers 31 journaled thereto by means of pins 32 which are adapted to engage suitable rails 33 for returning the tool from the exit end of the machine to the feed end thereof after its traverse through the welding machine.

Extending transversely of the frame 13 and secured at the opposite ends thereof to the longitudinal members 14 and 15 is a rod 34 which forms a handle which may be grasped by the operator to remove the tool from the welding machine. The rod 34 preferably extends outwardly from the sides of the longitudinal members 14 and 15 to form lugs 35 which may be engaged by a suitable conveyor chain, not shown, for returning the tool to the feed end of the machine.

The longitudinal members 14 and 15 of the frame 13 are provided with horizontal flanges 36 and 37 which are adapted to be supported upon rails 38 and 39 on the opposite ends of the welding machine. The bottom of the frame 13 has secured thereto spaced flanges 40 and 41 of a trough 42. The rear end of the trough 42 projects downwardly into engagement with the bottom of the trough 8 of the arbor as at 43 and operates as a scoop to receive the metal flash within the arbor trough. The rear end of the trough is closed by means of a plate 44.

In the type of welding machine disclosed in the copending applications, the welded blank is preferably removed from the machine by the insertion of the next succeeding blank. The flash removing tool herein disclosed is adapted to be disposed between the incoming and outgoing blank and to be pushed through the machine by the incoming blank. Other suitable methods of moving the tool through the machine may be employed, if desired. The tool is supported in proper position during its traverse through the machine by the pivotal arms 6 and 7 of the arbor 5 which are adapted to engage the flanges 40 and 41 disposed on opposite sides of the trough 42. The tool is supported in proper position for insertion into the welding machine by rails 38 disposed at the feed end of the machine where it is engaged by the blank being inserted into the machine and is supported at the exit end of the machine by rails 39 after its movement through the machine.

As before mentioned, the tool is provided with rollers 31 adapted to engage suitable rails 33 for returning the tool to the feed end of the machine where it is again accessible for use. Any suitable means may be provided for returning the tool.

Having thus described the nature of the invention, it is understood that various modifications may be made within the scope of the accompanying claims.

We claim:

1. A tool for use in conjunction with a flash welding machine having electrodes and a flash receiving trough beneath said electrodes, comprising a frame, members carried by said frame and disposed to brush said electrodes when the tool is passed through the machine, and means depending from said frame for removing the metal flash in said trough simultaneously with said brushing operation.

2. A tool for use in conjunction with a flash welding machine having electrodes and a flash receiving trough beneath said electrodes, comprising a frame, brush members movably connected to said frame disposed to brush said electrodes when the tool is passed through the machine, resilient means tending to maintain said brush members in predetermined position relative to said frame, and means carried by said frame for removing the metal flash in said trough simultaneously with said brushing operation.

3. A tool for use in a flash welding machine having electrodes and a flash receiving trough beneath said electrodes, comprising a frame adapted to be engaged by an incoming work piece to move it through the machine, a longitudinally extending bracket having one end thereof pivotally connected to said frame, resilient means for positioning the opposite end of said bracket, brushes connected to said bracket and disposed to engage adjacent faces of said electrodes, members secured to said frame and disposed to wipe the contact faces of said electrodes, and means depending from said frame for removing metal flash from said trough when the tool is passed through the welding machine.

4. A tool for use in connection with a welding machine of the class described having welding electrodes, said tool comprising a frame, a longitudinally extending bracket having one end thereof pivotally connected to said frame, means for yieldably positioning the opposite end of said bracket, and obliquely disposed brushes secured to said bracket in position to engage adjacent faces of the welding electrodes when the tool is passed through the machine.

5. A tool for use in conjunction with a flash welding machine having electrodes and a flash receiving trough, said tool comprising a body member adapted to be passed through the machine, a scoop depending from the body member to remove the flash from the flash receiving trough, and a brush assembly carried on the body member in position to remove deposit from the welding machine electrodes; and means to hold the tool between the end of an outgoing pipe section and the end of an incoming blank to be welded whereby the tool is traveled through the welding machine during the loading and unloading thereof.

6. A tool for cleaning the electrodes of a flash welding machine, comprising a frame adapted to pass through the machine longitudinally of the electrodes, means on the frame for engaging the front edge of an incoming work piece, and cleaning elements disposed on the frame in position to clean the electrodes as the frame is moved through the machine.

7. A tool for cleaning a machine for flash welding a long seam in a work piece, said tool being adapted to be moved through the machine by an incoming work piece in the direction parallel to the seam to be welded, comprising a frame, means on the frame for engaging a work piece, and cleaning elements carried by the tool in position to engage and clean from the machine accumulations of flash from previous welding operations.

8. A tool for cleaning flash from the operating portions of a flash welding machine having welding electrodes and a flash receiving trough, said tool being adapted to pass through the machine between an incoming and an outgoing work piece, comprising a body member, means on the body member for engaging work pieces, a scoop depending from the body member to remove flash from the flash receiving trough, and brushes carried by the body member in position to brush the welding electrodes.

In witness whereof we have hereunto subscribed our names at Milwaukee, Wisconsin, this 15th day of November, 1930.

WARREN F. HEINEMAN.
SVEN MALKE.